United States Patent
Yano et al.

(10) Patent No.: US 9,799,896 B2
(45) Date of Patent: Oct. 24, 2017

(54) STAINLESS STEEL FOIL FOR SEPARATORS OF POLYMER ELECTROLYTE FUEL CELLS

(71) Applicant: JFE STEEL CORPORATION, Tokyo (JP)

(72) Inventors: Takayoshi Yano, Tokyo (JP); Shin Ishikawa, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 0 days.

(21) Appl. No.: 15/025,744

(22) PCT Filed: Sep. 2, 2014

(86) PCT No.: PCT/JP2014/004509
§ 371 (c)(1),
(2) Date: Mar. 29, 2016

(87) PCT Pub. No.: WO2015/059857
PCT Pub. Date: Apr. 30, 2015

(65) Prior Publication Data
US 2016/0240866 A1 Aug. 18, 2016

(30) Foreign Application Priority Data

Oct. 22, 2013 (JP) ................ 2013-219381
Oct. 31, 2013 (JP) ................ 2013-227451
Jan. 9, 2014 (JP) ................ 2014-002578

(51) Int. Cl.
*H01M 8/0228* (2016.01)
*C25D 5/36* (2006.01)
(Continued)

(52) U.S. Cl.
CPC ........... *H01M 8/0228* (2013.01); *C22C 19/03* (2013.01); *C22C 38/18* (2013.01); *C25D 3/12* (2013.01); *C25D 3/30* (2013.01); *C25D 3/38* (2013.01); *C25D 3/46* (2013.01); *C25D 3/48* (2013.01); *C25D 5/10* (2013.01); *C25D 5/12* (2013.01); *C25D 5/36* (2013.01); *C25D 7/0614* (2013.01); *C25D 11/34* (2013.01); *H01M 8/021* (2013.01); *H01M 8/1018* (2013.01); *C25D 3/60* (2013.01); *H01M 2008/1095* (2013.01)

(58) Field of Classification Search
CPC ....... H01M 2008/1095; H01M 8/0202; H01M 8/0208; H01M 8/0228
See application file for complete search history.

(56) References Cited

U.S. PATENT DOCUMENTS

| 6,660,419 B1 * | 12/2003 | Nishida ............... H01M 8/0206 429/210 |
| 2003/0113577 A1 | 6/2003 | Zheng |
| 2013/0177837 A1 | 7/2013 | Nishiyama et al. |

FOREIGN PATENT DOCUMENTS

| CN | 102859768 A | 1/2013 |
| EP | 2560225 A1 | 2/2013 |

(Continued)

OTHER PUBLICATIONS

Oct. 7, 2014 International Search Report issued in International Patent Application No. PCT/JP2014/004509.
(Continued)

*Primary Examiner* — Basia Ridley
*Assistant Examiner* — Heng Chan
(74) *Attorney, Agent, or Firm* — Oliff PLC

(57) ABSTRACT

The surface of a substrate made of stainless steel foil is coated with a Sn alloy layer, with a strike layer in between. The coating weight of the strike layer is 0.001 g/m² to 1 g/m².

21 Claims, 2 Drawing Sheets

(51) Int. Cl.
  *C22C 38/18*     (2006.01)
  *H01M 8/021*    (2016.01)
  *C25D 3/38*      (2006.01)
  *C25D 3/46*      (2006.01)
  *C25D 3/48*      (2006.01)
  *C25D 5/10*      (2006.01)
  *C25D 5/12*      (2006.01)
  *C25D 7/06*      (2006.01)
  *C25D 11/34*    (2006.01)
  *C22C 19/03*    (2006.01)
  *C25D 3/12*      (2006.01)
  *C25D 3/30*      (2006.01)
  *H01M 8/1018*  (2016.01)
  *C25D 3/60*      (2006.01)

(56) References Cited

FOREIGN PATENT DOCUMENTS

| | | | | |
|---|---|---|---|---|
| JP | 61223197 A | * | 10/1986 | |
| JP | S61-223197 A | | 10/1986 | |
| JP | S62-103390 A | | 5/1987 | |
| JP | H08-180883 A | | 7/1996 | |
| JP | H10-228914 A | | 8/1998 | |
| JP | 2003-528980 A | | 9/2003 | |
| JP | 2006-312762 A | | 11/2006 | |
| JP | 2009032671 A | * | 2/2009 | |
| JP | 2012-178324 A | | 9/2012 | |
| JP | 2013-118096 A | | 6/2013 | |
| KR | 20120122090 A | * | 11/2012 | |
| WO | WO 2011132797 A1 | * | 10/2011 | .......... H01M 8/0208 |

OTHER PUBLICATIONS

May 27, 2015 Office Action issued in Taiwanese Patent Application No. 103132376.

Jun. 30, 2016 Search Report issued in European Application No. 14856149.1.

Jun. 20, 2016 Office Action issued in Korean Application No. 2016-7009288.

Oct. 10, 2016 Office Action issued in Chinese Patent Application No. 201480058318.3.

Jan. 24, 2017 Office Action issued in European Patent Application No. 14 856 149.1.

May 12, 2017 Office Action issued in Chinese Patent Application No. 201480058318.3.

* cited by examiner

STAINLESS STEEL FOIL FOR SEPARATORS OF POLYMER ELECTROLYTE FUEL CELLS

TECHNICAL FIELD

The disclosure relates to a stainless steel foil for separators of polymer electrolyte fuel cells having excellent corrosion resistance property and adhesion property.

BACKGROUND

In recent years, fuel cells that have excellent generation efficiency and emit no $CO_2$ are being developed for global environment protection. Such a fuel cell generates electricity from $H_2$ and $O_2$ through an electrochemical reaction. The fuel cell has a sandwich-like basic structure, and includes an electrolyte membrane (ion-exchange membrane), two electrodes (fuel electrode and air electrode), gas diffusion layers of $O_2$ (air) and $H_2$, and two separators.

Fuel cells are classified as phosphoric acid fuel cells, molten carbonate fuel cells, solid oxide fuel cells, alkaline fuel cells, and proton-exchange membrane fuel cells (PEMFC) or polymer electrolyte fuel cells (PEFC) according to the type of electrolyte membrane used, which are each being developed.

Of these fuel cells, polymer electrolyte fuel cells have, for example, the following advantages over other fuel cells.

(a) The fuel cell operating temperature is about 80° C., so that electricity can be generated at significantly low temperature.

(b) The fuel cell body can be reduced in weight and size.

(c) The fuel cell can be started promptly, and has high fuel efficiency and power density.

Polymer electrolyte fuel cells are therefore expected to be used as power sources in electric vehicles, home or industrial stationary generators, and portable small generators.

A polymer electrolyte fuel cell extracts electricity from $H_2$ and $O_2$ via a polymer membrane. As illustrated in FIG. 1, a membrane-electrode joined body 1 is sandwiched between gas diffusion layers 2 and 3 (for example, carbon paper) and separators (bipolar plates) 4 and 5, forming a single component (a single cell). An electromotive force is generated between the separators 4 and 5.

The membrane-electrode joined body 1 is called a membrane-electrode assembly (MEA). The membrane-electrode joined body 1 is an assembly of a polymer membrane and an electrode material such as carbon black carrying a platinum catalyst on the front and back surfaces of the membrane, and has a thickness of several 10 μm to several 100 μm. The gas diffusion layers 2 and 3 are often integrated with the membrane-electrode joined body 1.

In the case of actually using polymer electrolyte fuel cells, several tens to hundreds of single cells such as the above are typically connected in series to form a fuel cell stack and put to use.

The separators 4 and 5 are required to function not only as (a) partition walls separating single cells, but also as (b) conductors carrying generated electrons, (c) air passages 6 through which $O_2$ (air) flows and hydrogen passages 7 through which Hz flows, and (d) exhaust passages through which generated water or gas is exhausted (the air passages 6 or the hydrogen passages 7 also serve as the exhaust passages).

The separators therefore need to have excellent durability and electric conductivity.

Regarding durability, about 5000 hours are expected in the case of using the polymer electrolyte fuel cell as a power source in an electric vehicle, and about 40000 hours are expected in the case of using the polymer electrolyte fuel cell as a home stationary generator or the like. Given that the proton conductivity of the polymer membrane (electrolyte membrane) decreases if metal ions leach due to corrosion, the separators need to be durable for long-term generation.

Regarding electric conductivity, the contact resistance between the separator and the gas diffusion layer is desirably as low as possible, because an increase in contact resistance between the separator and the gas diffusion layer causes lower generation efficiency of the polymer electrolyte fuel cell. A lower contact resistance between the separator and the gas diffusion layer contributes to better power generation property.

Polymer electrolyte fuel cells using graphite as separators have already been commercialized. The separators made of graphite are advantageous in that the contact resistance is relatively low and also corrosion does not occur. The separators made of graphite, however, easily break on impact, and so are disadvantageous in that the size reduction is difficult and the processing cost for forming gas flow passages is high. These drawbacks of the separators made of graphite hinder the widespread use of polymer electrolyte fuel cells.

Attempts have been made to use a metal material as the separator material instead of graphite. In particular, various studies have been conducted to commercialize separators made of stainless steel, titanium, a titanium alloy, or the like for enhanced durability.

For example, Patent Literature (PTL) 1 discloses a technique of using, as separators, a metal such as stainless steel or a titanium alloy that easily forms a passive film. The formation of the passive film, however, causes an increase in contact resistance, and leads to lower generation efficiency. These metal materials have thus been pointed out to have problems such as high contact resistance and low corrosion resistance property as compared with the graphite material.

PTL 2 discloses a technique of plating the surface of a metal separator such as an austenitic stainless steel sheet (SUS304) with gold to reduce the contact resistance and ensure high output. However, a thin gold plating is hard to be kept from the formation of pinholes, and a thick gold plating is problematic in terms of cost.

To solve these problems, we previously proposed in PTL 3 "a metal sheet for separators of polymer electrolyte fuel cells wherein a film made of a Sn alloy layer is formed on the surface of a metal substrate and the film includes conductive particles".

CITATION LIST

Patent Literatures

PTL 1: JP H8-180883 A
PTL 2: JP H10-228914 A
PTL 3: JP 2012-178324 A
PTL 4: JP 2013-118096 A

SUMMARY

Technical Problem

Through the development of the metal sheet for separators of polymer electrolyte fuel cells described in PTL 3, we succeeded in improving the corrosion resistance property in the use environment of separators of polymer electrolyte fuel cells.

In applications to fuel cells used in vehicles, etc., however, thinner separators are needed to make fuel cells more compact in terms of installation space and energy efficiency.

We accordingly proposed in PTL 4 a surface treatment method for separators of fuel cells wherein the surface of a substrate made of high Cr stainless steel is subjected to anode electrolytic treatment that induces a Cr transpassive dissolution reaction and then immediately subjected to $Ni_3Sn_2$ layer formation, without the formation of an intermediate layer.

We thus succeeded in obtaining separators of polymer electrolyte fuel cells having excellent corrosion resistance property even in the case where the film made of the Sn alloy layer such as the $Ni_3Sn_2$ layer (hereafter referred to as "Sn alloy layer") is made thinner.

In the fuel cell manufacturing process, high adhesion between the substrate and the Sn alloy layer is necessary so that the Sn alloy layer does not peel off the substrate. With the technique described in PTL 4, however, the adhesion property is not always sufficient, for example, in the process of forming the separator into a desired shape, in the process of assembling the fuel cell, or when the fuel cell vibrates violently during use, and there is a possibility that the film peels.

It could therefore be helpful to provide a stainless steel foil for separators of polymer electrolyte fuel cells not only having excellent electric conductivity but also having both excellent corrosion resistance property in the use environment of separators of polymer electrolyte fuel cells and excellent adhesion property between the substrate and the Sn alloy layer even in the case where the Sn alloy layer is made thinner.

Solution to Problem

We employed stainless steel foil as the material of separators of polymer electrolyte fuel cells, and studied various film formation processes for the stainless steel foil.

As a result, we made the following discoveries.

(1) First, to improve the adhesion property, we attempted to form a strike layer made of a pure metal layer of Ni, Cu, or the like as a base film on the surface of a substrate made of stainless steel foil, prior to the formation of a Sn alloy layer. We then discovered that forming the strike layer as the base film on the surface of the substrate made of stainless steel foil significantly improves the adhesion property of the Sn alloy layer. The formation of the strike layer is, however, disadvantageous in terms of compactness.

(2) Next, we attempted to form a thinner Sn alloy layer after forming the strike layer, and discovered the following. When the Sn alloy layer is made thinner, defects from the Sn alloy layer to the substrate made of stainless steel foil increase, and the strike layer is continuously corroded through these defects. This causes the Sn alloy layer above the strike layer to peel, exposing the stainless steel foil substrate to the separator use environment. As a result, the corrosion resistance property degrades significantly.

(3) We carried out further research to prevent the degradation of the corrosion resistance property in the case of making the Sn alloy layer thinner.

As a result, we discovered that, by limiting the coating weight of the strike layer to the range of 0.001 $g/m^2$ to 1 $g/m^2$ which is lower than in conventional techniques, the continuous corrosion of the strike layer is suppressed, so that the degradation of the corrosion resistance property associated with the peeling of the Sn alloy layer is effectively prevented without degradation in adhesion property.

The reason why limiting the coating weight of the strike layer to the range of 0.001 $g/m^2$ to 1 $g/m^2$ suppresses the continuous corrosion of the strike layer appears to be as follows.

By limiting the coating weight of the strike layer to a range lower than in conventional techniques, a discontinuous portion such as a non-plating area of the strike layer appears on the surface of the stainless steel foil substrate, and this discontinuous portion of the strike layer acts as an area that inhibits the propagation of the corrosion. Hence, the continuous corrosion of the strike layer can be suppressed even in the case where the Sn alloy layer is made thinner.

(4) We also discovered that, while the strike layer may be a pure metal layer of Au, Ag, Cu, Ni, or the like or an alloy layer including at least one type selected from these elements, a Ni—P strike layer made of an alloy layer of Ni and P is particularly suitable as the strike layer for its low material cost and excellent corrosion resistance property. We further discovered that, by limiting the P content in the Ni—P strike layer to the range of 5% to 22% by mass, excellent corrosion resistance property can be maintained more stably even in the event of long exposure to high potential in the separator use environment.

The reason for this appears to be as follows. By limiting the P content in the Ni—P strike layer to the range of 5% to 22% by mass, a more stable Ni—P compound in the separator use environment is formed, with it being possible to further suppress the corrosion of the strike layer.

(5) In addition, we discovered that coating the surface of the Sn alloy layer with a Sn-containing oxide layer further improves the corrosion resistance property.

The reason for this appears to be as follows. Since the Sn-containing oxide layer is very stable in the separator use environment, coating the surface of the Sn alloy layer with the Sn-containing oxide layer suppresses the corrosion of the Sn alloy layer effectively. The corrosion resistance property can be further improved by such an effect.

The disclosure is based on the aforementioned discoveries.

We thus provide the following.

1. A stainless steel foil for separators of polymer electrolyte fuel cells, including: a substrate made of stainless steel foil; and a Sn alloy layer with which a surface of the substrate is coated, with a strike layer in between, wherein a coating weight of the strike layer is 0.001 $g/m^2$ to 1 $g/m^2$.

2. The stainless steel foil for separators of polymer electrolyte fuel cells according to the foregoing 1, wherein the Sn alloy layer includes at least one type of element selected from the group consisting of Ni and Fe.

3. The stainless steel foil for separators of polymer electrolyte fuel cells according to the foregoing 1 or 2, wherein the Sn alloy layer includes at least one type selected from the group consisting of $Ni_3Sn_2$, $Ni_3Sn_4$, FeSn and $FeSn_2$.

4. The stainless steel foil for separators of polymer electrolyte fuel cells according to any one of the foregoing 1 to 3, wherein the strike layer includes at least one type of element selected from the group consisting of Ni, Cu, Ag, and Au.

5. The stainless steel foil for separators of polymer electrolyte fuel cells according to the foregoing 4, wherein the strike layer is made of an alloy layer of Ni and P, and has a P content in a range of 5% to 22% by mass.

6. The stainless steel foil for separators of polymer electrolyte fuel cells according to any one of the foregoing 1 to 5, including a Sn-containing oxide layer on a surface of the Sn alloy layer.

Advantageous Effect

It is possible to obtain a separator of a fuel cell having excellent corrosion resistance property and adhesion property without compromising compactness, and thus obtain a polymer electrolyte fuel cell having excellent durability at low cost.

BRIEF DESCRIPTION OF THE DRAWINGS

In the accompanying drawings.

DETAILED DESCRIPTION

Figure 1:
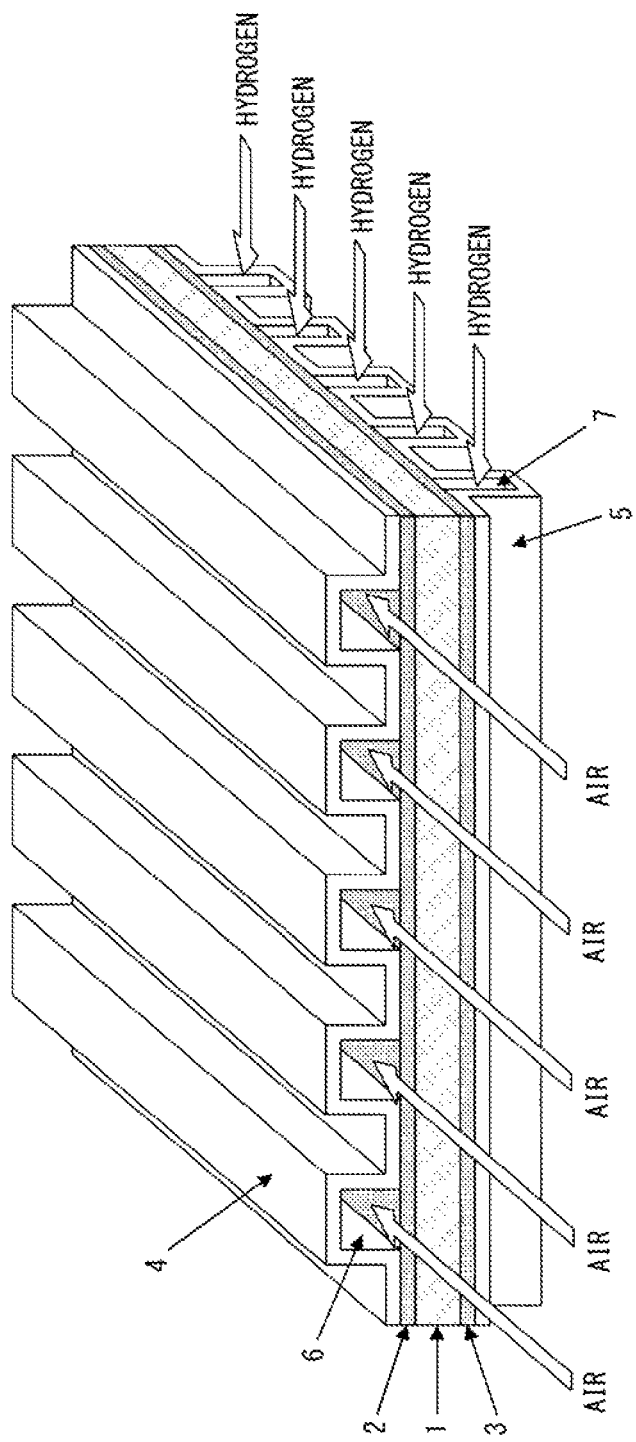
FIG. 1 is a schematic diagram illustrating the basic structure of a fuel cell.

Detailed description is given below.
(1) Metal Sheet Used as Substrate
Stainless steel foil used as a substrate in the disclosure is not particularly limited, though a stainless steel sheet excellent in corrosion resistance property (ferritic stainless steel sheet, austenitic stainless steel sheet, dual-phase stainless steel sheet) is particularly advantageous.

For example, SUS447J1 (Cr: 30% by mass), SUS445J1 (Cr: 22% by mass), SUS316L (Cr: 18% by mass), or the like is suitable. SUS447J1 including about 30% by mass Cr has high corrosion resistance property, and so is particularly advantageous as the substrate for separators of polymer electrolyte fuel cells used in an environment where high corrosion resistance property is required.

In view of the installation space or weight when stacking fuel cells, the sheet thickness of the stainless steel foil for separators is preferably in the range of 0.03 mm to 0.3 mm. If the sheet thickness of the stainless steel foil for separators is less than 0.03 mm, the production efficiency of stainless steel foil declines. If the sheet thickness of the stainless steel foil for separators exceeds 0.3 mm, the installation space or weight when stacking fuel cells increases. The sheet thickness of the stainless steel foil for separators is more preferably in the range of 0.03 mm to 0.1 mm.

(2) Sn Alloy Layer
As a Sn alloy layer with which the surface of the substrate is coated, a Sn alloy including Ni or Fe excellent in corrosion resistance property in the use environment (pH: 3 (sulfuric acid environment), use temperature: 80° C.) of separators of polymer electrolyte fuel cells is preferably used. $Ni_3Sn_2$, $Ni_3Sn_4$, FeSn and $FeSn_2$ is more preferable. $Ni_3Sn_2$ which is an intermetallic compound is particularly preferable.

The reason why the aforementioned Sn alloy is excellent in corrosion resistance property in the use environment of separators of polymer electrolyte fuel cells appears to be as follows.

A bond in a Sn alloy, such as a Sn—Ni or Sn—Fe bond, has a more stable bonding state than a Sn—Sn bond in simple metal Sn, and so improves the corrosion resistance property. In particular, $Ni_3Sn_2$ has a formation temperature in a high temperature range of 790° C. or more according to a binary alloy phase diagram of Ni—Sn and forms a very stable Sn—Ni bond, which contributes to excellent corrosion resistance property.

The film thickness of the Sn alloy layer is preferably 5 μm or less in terms of the installation space or weight when stacking fuel cells. If the film thickness of the Sn alloy layer is less than 0.1 μm, coating defects increase and the corrosion resistance property tends to degrade. Accordingly, the film thickness of the Sn alloy layer is preferably 0.1 μm or more. The film thickness of the Sn alloy layer is more preferably in the range of 0.5 μm to 3 μm.

A plating method is suitable for the formation of the Sn alloy layer on the surface of the stainless steel foil substrate. In this case, a conventionally known plating method may be used to immerse the substrate in a plating bath adjusted to a predetermined composition and electroplate the substrate.

(Strike)

In the disclosure, a strike layer is formed between the stainless steel foil substrate and the Sn alloy layer to improve the adhesion between the film and the substrate. The reason why forming the strike layer between the stainless steel foil substrate and the Sn alloy layer improves the adhesion between the film and the substrate appears to be as follows.

In the case where there is no strike layer, an inactive passive film or the like tends to be formed on the surface of the stainless steel foil substrate, making it difficult to attain high adhesion. In the case where the strike layer is provided, on the other hand, the formation of the passive film or the like is suppressed and the surface of the stainless steel foil substrate is kept from becoming inactive, as a result of which the adhesion between the substrate and the Sn alloy layer is improved.

A strike layer whose surface is uneven, for example, is more advantageous because the adhesion is further improved by the anchor effect.

The disclosed stainless steel foil for separators of polymer electrolyte fuel cells thus has excellent adhesion between the substrate and the Sn alloy layer, and therefore is advantageous in the process of forming the separator into a desired shape or the process of assembling the fuel cell where high adhesion is required, or when the fuel cell vibrates violently during use.

In the disclosure, it is very important to limit the coating weight of the strike layer to the following range:
the coating weight of the strike layer: 0.001 $g/m^2$ to 1 $g/m^2$.

By limiting the coating weight of the strike layer to this range, the corrosion resistance property in the separator use environment can be maintained even in the case where the Sn alloy layer is made thinner. The reason for this appears to be as follows.

Typically, when the film thickness of the Sn alloy layer is reduced, in-film defects from the Sn alloy layer to the substrate increase. Through these defects, the strike layer between the stainless steel foil substrate and the Sn alloy layer is widely corroded continuously and uniformly in the surface direction, causing the Sn alloy layer above the strike layer to peel off the stainless steel foil substrate. When the Sn alloy layer peels, the stainless steel substrate is exposed to the separator use environment, and as a result the corrosion resistance property declines.

Limiting the coating weight of the strike layer to a very low range, however, allows the strike layer to be formed discontinuously or non-uniformly on the surface of the substrate. In other words, a discontinuous portion such as a non-plating area of the strike layer appears in part of the surface of the substrate. This discontinuous portion of the strike layer acts as an area that inhibits the propagation of the corrosion. Hence, the continuous and uniform corrosion of the strike layer is suppressed even in the case where the Sn alloy layer is made thinner. The degradation of the corrosion resistance property can be prevented in this way.

If the coating weight of the strike layer is less than 0.001 g/m$^2$, the adhesion between the stainless steel foil substrate and the Sn alloy layer decreases. If the coating weight of the strike layer exceeds 1 g/m$^2$, the corrosion resistance property cannot be maintained in the case where the film thickness of the Sn alloy layer is reduced. Accordingly, the coating weight of the strike layer is limited to the range of 0.001 g/m$^2$ to 1 g/m$^2$. The coating weight of the strike layer is preferably in the range of 0.003 g/m$^2$ to 0.5 g/m$^2$, more preferably in the range of 0.003 g/m$^2$ to 0.3 g/m$^2$, and further preferably in the range of 0.005 g/m$^2$ to 0.05 g/m$^2$.

The strike layer is preferably a pure metal layer of Au, Ag, Cu, Ni, or the like or an alloy layer including at least one type selected from these elements. A Ni strike or a Ni—P strike made of an alloy layer of Ni and P is more preferable in terms of material cost.

In the case of a Ni—P strike, it is further preferable to limit the P content in the Ni—P strike layer to the range of 5% to 22% by mass.

P content in Ni—P strike layer: 5% to 22% by mass

By limiting the P content in the Ni—P strike layer to this range, excellent corrosion resistance property can be maintained more stably even in the event of long exposure to high potential in the separator environment. The reason for this appears to be as follows.

By limiting the P content in the Ni—P strike layer to the range of 5% to 22% by mass, a more stable Ni—P compound in the separator use environment is formed, with it being possible to suppress the corrosion of the strike layer effectively for a longer time.

If the P content in the Ni—P strike layer is less than 5% by mass, the acid resistance improvement effect of the Ni—P compound is insufficient. Such a range is not preferable in terms of maintaining excellent corrosion resistance property in the event of long exposure to high potential in the separator environment which is acid. If the P content in the Ni—P strike layer exceeds 22% by mass, the composition of the Ni—P strike tends to be not uniform. Such a range is also not preferable in terms of maintaining excellent corrosion resistance property in the event of long exposure to high potential in the separator environment. Therefore, the P content in the Ni—P strike layer is preferably limited to the range of 5% to 22% by mass. The P content in the Ni—P strike layer is more preferably in the range of 7% to 20% by mass, and further preferably in the range of 10% to 18% by mass.

The method of forming the strike layer may be a conventionally known plating method whereby electroplating or electroless plating is performed in a plating bath adjusted to an appropriate composition. The coating weight of the strike layer is adjustable by the time of retention in the plating bath, i.e. the plating time.

The P content in the Ni—P strike layer is adjustable by the P concentration in the plating bath, the current density in electroplating, or the like.

(4) Sn-Containing Oxide Layer

In the disclosed stainless steel foil for separators, the surface of the Sn alloy layer is preferably coated with a Sn-containing oxide layer. This further improves the corrosion resistance property after long use in the separator use environment.

The Sn-containing oxide layer with which the surface of the Sn alloy layer is coated is not a natural oxide film created in the atmospheric environment but an oxide film deliberately formed by a process such as immersion in an acid solution. The film thickness of the natural oxide film is typically about 2 nm to 3 nm.

The main component of the Sn-containing oxide layer is preferably SnO$_2$. The film thickness of the Sn-containing oxide layer is preferably in the range of 5 nm to 50 nm. The film thickness of the Sn-containing oxide layer is more preferably in the range of 10 nm to 30 nm. If the Sn-containing oxide layer is excessively thick, the conductivity decreases. If the to Sn-containing oxide layer is excessively thin, the corrosion resistance property improvement effect in the separator use environment cannot be attained.

The reason why coating the surface of the Sn alloy layer with the Sn-containing oxide layer improves the corrosion resistance property after long use in the separator use environment appears to be as follows. Since the Sn-containing oxide layer is very stable in the separator use environment, coating the surface of the Sn alloy layer with the Sn-containing oxide layer suppresses the corrosion of the Sn alloy layer effectively.

Here, the oxide film is deliberately formed by a process such as immersion in an acid solution instead of using a natural oxide film, for the following reason. Through such a process, the oxide film can be uniformly and accurately formed on the surface of the Sn alloy layer, with it being possible to suppress the corrosion of the Sn alloy layer very effectively.

The Sn-containing oxide layer may be formed by a method of immersion in an acid aqueous solution having oxidizability such as hydrogen peroxide or nitric acid, or a method of electrochemical anode electrolytic treatment.

For example, the Sn-containing oxide layer can be formed by energizing, in a sulfuric acid aqueous solution of a temperature of 60° C. and a pH of 1, the stainless steel foil for separators having the Sn alloy layer for 5 minutes with a current density of +1 mA/cm$^2$.

The method of forming the Sn-containing oxide layer is not limited to the above. Other examples include physical vapor deposition (PVD), chemical vapor deposition (CVD), and coating.

(5) Other Features

After forming the Sn alloy layer on the surface of the stainless steel foil substrate with the strike layer in between or after forming the Sn alloy layer on the surface of the stainless steel foil substrate with the strike layer in between and then forming the Sn-containing oxide layer, a conductive layer with low electric resistance may be further formed on the Sn alloy layer or the Sn-containing oxide layer, to improve the conductivity which is one of the required properties of separators. For example, the Sn alloy layer or the Sn-containing oxide layer may be coated with a pure metal layer, a conductive polymer layer, an alloy layer including conductive particles, or a polymer layer including conductive particles, in order to reduce the contact resistance.

EXAMPLES

Separators of polymer electrolyte fuel cells are used in a severe corrosion environment of about 80° C. in temperature and 3 in pH, and therefore excellent corrosion resistance property is required. Moreover, high adhesion between the stainless steel foil substrate and the Sn alloy layer is required so that the Sn alloy layer does not peel off the stainless steel foil substrate in the fuel cell manufacturing process such as the process of forming the separator into a desired shape or the process of assembling the fuel cell. Further, a reduction in sheet thickness increase rate after the film formation on the surface of the stainless steel foil substrate is required to make the fuel cell more compact. In view of these required properties, the following three types of evaluation were conducted on the below-mentioned samples.

(1) Evaluation of Corrosion Resistance Property (Stability in Separator Use Environment)

(a) Evaluation of Corrosion Resistance Property after 20 Hours

Typically, stainless steel is more susceptible to transpassive dissolution and suffers greater degradation in corrosion resistance property when the applied potential is higher. To evaluate the stability in the event of exposure to high potential in the separator use environment, each sample was immersed in a sulfuric acid aqueous solution of a temperature of 80° C. and a pH of 3 and applied at a constant potential of 0.9 V (vs. SHE) for 20 hours using Ag/AgCl (saturated KCl aqueous solution) as a reference electrode, and the current density after 20 hours was measured. Based on the current density after 20 hours, the corrosion resistance property after 20 hours in the separator use environment was evaluated by the following criteria.

Excellent: the current density after 20 hours is less than 0.015 μA/cm$^2$.
Good: the current density after 20 hours is 0.015 μA/cm$^2$ or more and less than 0.2 μA/cm$^2$.
Poor: the current density after 20 hours is 0.2 μA/cm$^2$ or more.

(b) Evaluation of Corrosion Resistance Property after 50 Hours

The following evaluation was further conducted on each sample in which a Ni—P strike layer was formed as the strike layer and that showed favorable corrosion resistance property after 20 hours.

To evaluate the stability in the event of longer exposure to high potential in the separator use environment, each sample was immersed in a sulfuric acid aqueous solution of a temperature of 80° C. and a pH of 3 and applied at a constant potential of 0.9 V (vs. SHE) for 50 hours using Ag/AgCl (saturated KCl aqueous solution) as a reference electrode, and the current density after 20 hours and after 50 hours was measured. The ratio of the current density after 50 hours to the current density after 20 hours [(current density after 50 hours)/(current density after 20 hours)×100] was then determined. Based on the ratio of the current density after 50 hours to the current density after 20 hours, the corrosion resistance property after 50 hours in the separator use environment was evaluated by the following criteria.

Excellent: the ratio of the current density after 50 hours to the current density after 20 hours is less than 80%.
Good: the ratio of the current density after 50 hours to the current density after 20 hours is 80% or more and less than 100%.
Poor: the ratio of the current density after 50 hours to the current density after 20 hours is 100% or more.

(2) Evaluation of Adhesion Property

Figure 2:
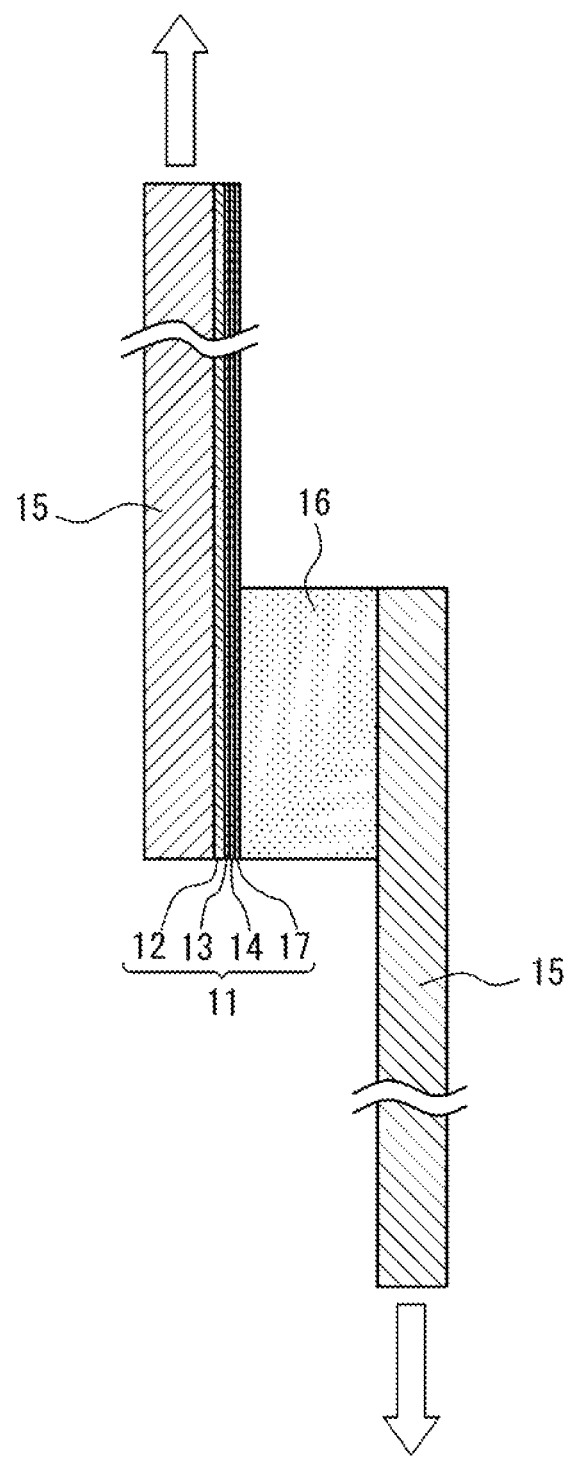
FIG. 2 is a schematic diagram illustrating a test piece for an adhesion test.

Each sample having the film formed on the surface of the substrate (0.05 mm in thickness) was cut to 25 mm W×80 mm L. The cut sample and a cold rolled steel sheet of 25 mm W×80 mm L×1 mm t were joined so as to partially overlap in the surface coated with the film, to produce a test piece for adhesion evaluation as illustrated in FIG. 2. Here, the sample and the cold rolled steel sheet were joined using an adhesive (E-56 manufactured by Sunrise MSI Corporation) with the thickness of the adhesive being 2 mm and the adhesion area being 25 mm W×20 mm L. Due to the small sheet thickness of the sample (substrate), another cold rolled steel sheet (25 mm W×80 mm L×1 mm t) was joined to the opposite surface to the surface bonded to the cold rolled steel sheet, for reinforcement.

In FIG. 2, reference sign 11 is a sample, 12 is a stainless steel foil substrate, 13 is a strike layer, 14 is a Sn alloy layer, 15 is a cold rolled steel sheet, 16 is an adhesive, and 17 is a Sn-containing oxide layer.

The obtained test piece for adhesion evaluation was pulled from both sides by a tensile tester to determine the tensile strength (peel strength) at the time of peeling of the film off the substrate, and the adhesion property of the film was evaluated by the following criteria.

Excellent: the peel strength is 6 MPa or more.
Good: the peel strength is 2 MPa or more and less than 6 MPa.
Poor: the peel strength is less than 2 MPa.

(3) Evaluation of Compactness

The sheet thickness increase rate was calculated using the equation below, and the compactness when stacking fuel cells was evaluated by the following criteria.

Sheet thickness increase rate (%)=[([film thickness of film per side]×2)/[film thickness of stainless steel foil substrate]]×100.

Good: the sheet thickness increase rate is 20% or less.
Poor: the sheet thickness increase rate exceeds 20%.

The film thickness of the film mentioned here is the sum of the average film thickness of the strike layer determined by converting the coating weight and the film thickness of the Sn alloy layer, or the sum of the average film thickness of the strike layer determined by converting the coating weight and the film thickness of the Sn alloy layer and Sn-containing oxide layer.

Example 1

Each of SUS447J1 (Cr: 30% by mass), SUS445J1 (Cr: 22% by mass), and SUS316L (Cr: 18% by mass) of 0.05 mm in sheet thickness as a stainless steel foil substrate was subjected to appropriate pretreatment such as degreasing, and then a strike layer with a coating weight shown in Table 1 was formed on the stainless steel foil substrate using the following plating bath composition and plating condition. Next, a Sn alloy layer with an average film thickness shown in Table 1 was formed on the stainless steel foil substrate having the strike layer, to obtain a stainless steel foil for separators.

In some of the samples, the obtained stainless steel foil for separators was energized in a sulfuric acid aqueous solution of a temperature of 60° C. and a pH of 1 for 5 minutes with a current density of +1 mA/cm$^2$, to form a Sn-containing oxide layer on the surface of the Sn alloy layer.

Each property was evaluated in the aforementioned manner using the obtained stainless steel foil for separators.

The coating weight of the strike layer, the average film thickness of the Sn alloy layer, and the average film thickness of the Sn-containing oxide layer were each regulated by determining the relationship with the plating time or the anode electrolysis time beforehand. For comparison, a stainless steel foil for separators having no strike layer was also prepared, and each property was evaluated in the aforementioned manner.

The coating weight of the strike layer was measured by the following method. First, each sample obtained by forming the strike layer on the surface of the substrate (0.05 mm in thickness) was cut to about 50 mm W×50 mm L, the lengths of two sides were measured by a caliper square, and the sample area was calculated. The sample was then immersed in a solution in which the strike layer can be dissolved (a known dissociation solution may be used, such as 30% nitric acid for Ni, Ni—P, or Cu strike, 90% sulfuric acid+10% nitric acid for Ag strike, and 30 g/L sodium cyanide+40 mL/L hydrogen peroxide for Au strike) for 10 minutes to dissolve the strike layer. The constituent element of the strike layer dissolved in the solution was quantified using an inductively coupled plasma (ICP) emission spectrometric analyzer, and the sample area was divided by the quantification result, thus yielding the coating weight (g/m$^2$). Moreover, the coating weight was divided by the density of the strike metal, to determine the average film thickness of the strike layer. Regarding the samples having no strike, "–" is shown in both of the fields of the coating weight and converted average film thickness of the strike layer in Table 1.

The average film thickness of the Sn alloy layer was measured by the following method. First, each sample obtained by forming the strike layer and the Sn alloy layer on the surface of the substrate (0.05 mm in thickness) was cut to about 10 mm W×15 mm L. The sample was then embedded in resin, polished in the cross section, and then observed using a scanning electron microscope (SEM) to measure the film thickness of the Sn alloy layer. The measurement of the film thickness of the Sn alloy layer was performed on 10 samples obtained by cutting the same sample having the Sn alloy layer to the aforementioned shape, and the average film thickness of these samples was set as the average film thickness of the Sn alloy layer.

Here, the composition of the Sn alloy layer was identified by an energy-dispersive X-ray spectrometer (EDX) and X-ray diffractometer (XRD) used in the SEM observation.

The average film thickness of the Sn-containing oxide layer was measured by the following method. First, each sample obtained by forming the strike layer, the Sn alloy layer, and the Sn-containing oxide layer on the surface of the substrate (0.05 mm in thickness) was processed by a focused ion beam to prepare a thin film for cross-section observation. The produced thin film for cross-section observation was then observed using a transmission electron microscope (TEM), to measure the average film thickness of the Sn-containing oxide layer. In the measurement of the average film thickness of the Sn-containing oxide layer, the film thickness of the Sn-containing oxide layer in the prepared thin film for cross-section observation was measured at three locations, and the average value of the three locations was set as the average film thickness of the Sn-containing oxide layer.

Here, the composition of the oxide layer was identified by an energy-dispersive X-ray spectrometer (EDX) and X-ray photoelectron spectrometer (XPS) used in the TEM observation.

(Plating Bath Composition and Plating Condition of Strike Layer)

<Ni Strike>
  Nickel chloride: 240 g/L
  Hydrochloric acid: 125 ml/L
  Temperature: 50° C.
  Current density: 5 A/dm$^2$
<Ni—P Strike>
  Nickel sulfate: 1 mol/L
  Nickel chloride: 0.1 mol/L
  Boric acid: 0.5 mol/L
  Sodium phosphite: 0.05 mol/L to 5 mol/L
  Temperature: 50° C.
  Current density: 5 A/dm$^2$
<Cu Strike>
  Copper cyanide: 30 g/L
  Sodium cyanide: 40 g/L
  Potassium hydroxide: 4 g/L
  Temperature: 40° C.
  Current density: 5 A/dm$^2$
<Ag Strike>
  Silver potassium cyanide: 2 g/L
  Sodium cyanide: 120 g/L
  Temperature: 30° C.
  Current density: 3 A/dm$^2$
<Au Strike>
  Gold potassium cyanide: 8 g/L
  Sodium citrate: 80 g/L
  Nickel sulfamate: 3 g/L
  Zinc acetate: 0.3 g/L
  Temperature: 30° C.
  Current density: 3 A/dm$^2$ (Plating Bath Composition and Plating Condition of Sn Alloy Layer)

<Ni$_3$Sn$_2$>
  Nickel chloride: 0.15 mol/L
  Tin chloride: 0.15 mol/L
  Potassium pyrophosphate: 0.45 mol/L
  Glycine: 0.15 mol/L
  Temperature: 60° C.
  Current density: 1 A/dm$^2$
<Ni$_3$Sn$_4$>
  Nickel chloride: 0.15 mol/L
  Tin chloride: 0.30 mol/L
  Potassium pyrophosphate: 0.45 mol/L
  Temperature: 60° C.
  Current density: 1 A/dm$^2$
<FeSn>
  Ferric chloride: 0.15 mol/L
  Tin chloride: 0.18 mol/L
  Potassium pyrophosphate: 0.45 mol/L
  Temperature: 60° C.
  Current density: 1 A/dm$^2$
<FeSn$_2$>
  Ferric chloride: 0.15 mol/L
  Tin chloride: 0.36 mol/L
  Potassium pyrophosphate: 0.45 mol/L
  Temperature: 60° C.
  Current density: 1 A/dm$^2$ In the disclosure, as long as a desired plating can be formed, a plating bath composition other than the above may be used according to a known plating method.

Tables 1 and 2 summarize the results of evaluating the corrosion resistance property (stability in the separator use environment), the adhesion property, and the compactness for each sample obtained as described above.

TABLE 1

| | | Sample preparation condition | | | | | | | |
|---|---|---|---|---|---|---|---|---|---|
| | | Strike layer | | | | Sn alloy layer | | Sn-containing oxide layer | | Current |
| | | | | | Converted | | Average | | | density |
| Sample No. | Substrate | Type | Coating weight (g/m$^2$) | P content (% by mass) | average film thickness (nm) | Main component | film thickness (μm) | Main component | Average film thickness (μm) | after 20 hours (μA/cm$^2$) |
| 1 | SUS447J1 | N/A | — | — | — | Ni$_3$Sn$_2$ | 3.0 | — | — | 0.018 |
| 2 | | Ni | 0.001 | — | 0.1 | | 3.0 | — | — | 0.020 |

TABLE 1-continued

| Sample No. | | | | | | | | |
|---|---|---|---|---|---|---|---|---|
| 3 | | 0.05 | — | 5.6 | 0.5 | — | — | 0.036 |
| 4 | | 0.05 | — | 5.6 | 1.0 | — | — | 0.027 |
| 5 | | 0.1 | — | 11.2 | 3.0 | — | — | 0.025 |
| 6 | | 0.1 | — | 11.2 | 3.0 | SnO$_2$ | 15 | 0.014 |
| 7 | | 0.4 | — | 44.9 | 1.0 | — | — | 0.036 |
| 8 | | 0.4 | — | 44.9 | 3.0 | — | — | 0.030 |
| 9 | | 0.4 | — | 44.9 | 4.9 | — | — | 0.024 |
| 10 | | 0.9 | — | 101.1 | 3.0 | — | — | 0.064 |
| 11 | | 4.5 | — | 505.6 | 3.0 | — | — | 36.725 |
| 12 | | 4.5 | — | 505.6 | 8.0 | — | — | 0.079 |
| 13 | Ni—P | 0.003 | 15 | 0.4 | 3.0 | — | — | 0.026 |
| 14 | | 0.005 | 13 | 0.7 | 1.0 | — | — | 0.020 |
| 15 | | 0.005 | 15 | 0.7 | 1.0 | SnO$_2$ | 15 | 0.011 |
| 15a | | 0.01 | 3 | 1.3 | 1.0 | — | — | 0.034 |
| 15b | | 0.01 | 5 | 1.3 | 1.0 | — | — | 0.028 |
| 15c | | 0.01 | 7 | 1.3 | 1.0 | — | — | 0.025 |
| 15d | | 0.01 | 10 | 1.3 | 1.0 | — | — | 0.024 |
| 16 | | 0.01 | 13 | 1.3 | 0.5 | — | — | 0.023 |
| 17 | | 0.01 | 15 | 1.3 | 1.0 | — | — | 0.021 |
| 18 | | 0.01 | 15 | 1.3 | 1.0 | SnO$_2$ | 15 | 0.012 |
| 18a | | 0.01 | 18 | 1.3 | 1.0 | — | — | 0.023 |
| 18b | | 0.01 | 22 | 1.3 | 1.0 | — | — | 0.029 |
| 18c | | 0.01 | 30 | 1.3 | 1.0 | — | — | 0.036 |
| 19 | | 0.15 | 14 | 19.7 | 1.0 | — | — | 0.029 |
| 19a | | 0.15 | 14 | 19.7 | 1.0 | SnO$_2$ | 15 | 0.011 |
| 20 | | 0.15 | 15 | 19.7 | 3.0 | — | — | 0.028 |
| 21 | | 0.15 | 13 | 19.7 | 4.9 | — | — | 0.024 |
| 22 | | 0.3 | 14 | 39.5 | 3.0 | — | — | 0.031 |
| 23 | | 1.0 | 14 | 131.6 | 3.0 | — | — | 0.055 |
| 24 | | 1.5 | 15 | 197.4 | 3.0 | — | — | 0.348 |

| Sample No. | Current density after 50 hours (µA/cm$^2$) | Current density ratio* (%) | Peel strength (MPa) | Sheet thickness increase rate (%) | Corrosion resistance after 20 hours | Corrosion resistance after 50 hours | Adhesion | Compactness | Remarks |
|---|---|---|---|---|---|---|---|---|---|
| 1 | — | — | 1.7 | 12.0 | Good | — | Poor | Good | Comparative Example |
| 2 | — | — | 4.7 | 12.0 | Good | — | Good | Good | Example |
| 3 | — | — | 6.7 | 2.0 | Good | — | Excellent | Good | Example |
| 4 | — | — | 6.5 | 4.0 | Good | — | Excellent | Good | Example |
| 5 | — | — | 8.7 | 12.0 | Good | — | Excellent | Good | Example |
| 6 | — | — | 8.5 | 12.1 | Excellent | — | Excellent | Good | Example |
| 7 | — | — | 9.0 | 4.2 | Good | — | Excellent | Good | Example |
| 8 | — | — | 9.4 | 12.2 | Good | — | Excellent | Good | Example |
| 9 | — | — | 9.2 | 19.8 | Good | — | Excellent | Good | Example |
| 10 | — | — | 9.8 | 12.4 | Good | — | Excellent | Good | Example |
| 11 | — | — | 10.3 | 14.0 | Poor | — | Excellent | Good | Comparative Example |
| 12 | — | — | 10.6 | 34.0 | Good | — | Excellent | Poor | Comparative Example |
| 13 | 0.018 | 69.2 | 4.2 | 12.0 | Good | Excellent | Good | Good | Example |
| 14 | 0.015 | 75.0 | 6.0 | 4.0 | Good | Excellent | Excellent | Good | Example |
| 15 | 0.008 | 72.7 | 6.3 | 4.1 | Excellent | Excellent | Excellent | Good | Example |
| 15a | 0.033 | 97.1 | 6.2 | 4.0 | Good | Good | Excellent | Good | Example |
| 15b | 0.022 | 78.6 | 6.8 | 4.0 | Good | Excellent | Excellent | Good | Example |
| 15c | 0.019 | 76.0 | 6.3 | 4.0 | Good | Excellent | Excellent | Good | Example |
| 15d | 0.017 | 70.8 | 6.5 | 4.0 | Good | Excellent | Excellent | Good | Example |
| 16 | 0.018 | 78.3 | 6.4 | 2.0 | Good | Excellent | Excellent | Good | Example |
| 17 | 0.015 | 71.4 | 6.2 | 4.0 | Good | Excellent | Excellent | Good | Example |
| 18 | 0.009 | 75.0 | 6.1 | 4.1 | Excellent | Excellent | Excellent | Good | Example |
| 18a | 0.017 | 73.9 | 6.5 | 4.0 | Good | Excellent | Excellent | Good | Example |
| 18b | 0.023 | 79.3 | 7.1 | 4.0 | Good | Excellent | Excellent | Good | Example |
| 18c | 0.034 | 94.4 | 6.8 | 4.0 | Good | Good | Excellent | Good | Example |
| 19 | 0.022 | 75.9 | 7.5 | 4.1 | Good | Excellent | Excellent | Good | Example |
| 19a | 0.008 | 72.7 | 7.3 | 4.1 | Excellent | Excellent | Excellent | Good | Example |
| 20 | 0.021 | 75.0 | 7.3 | 12.1 | Good | Excellent | Excellent | Good | Example |
| 21 | 0.017 | 70.8 | 7.6 | 19.7 | Good | Excellent | Excellent | Good | Example |
| 22 | 0.024 | 77.4 | 8.2 | 12.2 | Good | Excellent | Excellent | Good | Example |
| 23 | 0.043 | 78.2 | 8.5 | 12.5 | Good | Excellent | Excellent | Good | Example |
| 24 | — | — | 9.1 | 12.8 | Poor | — | Excellent | Good | Comparative Example |

*Ratio of current density after 50 hours to current density after 20 hours

TABLE 2

| Sample No. | Substrate | Strike layer Type | Strike layer Coating weight (g/m²) | Strike layer P content (% by mass) | Strike layer Converted average film thickness (nm) | Sn alloy layer Main component | Sn alloy layer Average film thickness (μm) | Sn-containing oxide layer Main component | Sn-containing oxide layer Average film thickness (μm) | Current density after 20 hours (μA/cm²) |
|---|---|---|---|---|---|---|---|---|---|---|
| 25 | SUS447J1 | Cu | 0.4 | — | 44.9 | Ni₃Sn₂ | 3.0 | — | — | 0.033 |
| 26 | | | 0.4 | — | 44.9 | | 3.0 | SnO₂ | 15 | 0.013 |
| 27 | | Ag | 0.5 | — | 56.2 | | 3.0 | — | — | 0.029 |
| 28 | | | 0.5 | — | 56.2 | | 3.0 | SnO₂ | 15 | 0.012 |
| 29 | | Au | 0.9 | — | 101.1 | | 3.0 | — | — | 0.017 |
| 30 | | | 0.9 | — | 101.1 | | 3.0 | SnO₂ | 15 | 0.010 |
| 31 | | Ni | 0.4 | — | 44.9 | Ni₃Sn₂ | 3.0 | — | — | 0.045 |
| 32 | | | 0.4 | — | 44.9 | | 3.0 | SnO₂ | 20 | 0.013 |
| 33 | | | 0.4 | — | 44.9 | FeSn | 3.0 | — | — | 0.066 |
| 34 | | | 0.4 | — | 44.9 | | 3.0 | SnO₂ | 25 | 0.014 |
| 35 | | | 0.4 | — | 44.9 | FeSn₂ | 3.0 | — | — | 0.064 |
| 36 | | | 0.4 | — | 44.9 | | 3.0 | SnO₂ | 25 | 0.013 |
| 37 | SUS445J1 | N/A | — | — | — | Ni₃Sn₂ | 3.0 | — | — | 0.038 |
| 38 | | Ni | 0.4 | — | 44.9 | | 3.0 | — | — | 0.045 |
| 38a | | Ni—P | 0.3 | 15 | 39.5 | | 3.0 | — | — | 0.041 |
| 40 | | Cu | 0.4 | — | 44.9 | | 3.0 | — | — | 0.038 |
| 41 | | Ag | 0.5 | — | 47.6 | | 3.0 | — | — | 0.041 |
| 42 | | Au | 0.9 | — | 46.6 | | 3.0 | — | — | 0.035 |
| 43 | SUS316L | N/A | — | — | — | Ni₃Sn₂ | 3.0 | — | — | 0.046 |
| 44 | | Ni | 0.4 | — | 44.9 | | 3.0 | — | — | 0.054 |
| 44a | | Ni—P | 0.3 | 15 | 39.5 | | 3.0 | — | — | 0.049 |
| 46 | | Cu | 0.4 | — | 44.9 | | 3.0 | — | — | 0.044 |
| 47 | | Ag | 0.5 | — | 47.6 | | 3.0 | — | — | 0.043 |
| 48 | | Au | 0.9 | — | 46.6 | | 3.0 | — | — | 0.038 |

| Sample No. | Current density after 50 hours (μA/cm²) | Current density ratio* (%) | Peel strength (MPa) | Sheet thickness increase rate (%) | Evaluation result Corrosion resistance after 20 hours | Evaluation result Corrosion resistance after 50 hours | Adhesion | Compactness | Remarks |
|---|---|---|---|---|---|---|---|---|---|
| 25 | — | — | 9.6 | 12.2 | Good | — | Excellent | Good | Example |
| 26 | — | — | 9.3 | 12.2 | Excellent | — | Excellent | Good | Example |
| 27 | — | — | 9.3 | 12.2 | Good | — | Excellent | Good | Example |
| 28 | — | — | 9.5 | 12.3 | Excellent | — | Excellent | Good | Example |
| 29 | — | — | 9.8 | 12.4 | Good | — | Excellent | Good | Example |
| 30 | — | — | 9.4 | 12.5 | Excellent | — | Excellent | Good | Example |
| 31 | — | — | 9.0 | 12.2 | Good | — | Excellent | Good | Example |
| 32 | — | — | 8.8 | 12.3 | Excellent | — | Excellent | Good | Example |
| 33 | — | — | 8.8 | 12.2 | Good | — | Excellent | Good | Example |
| 34 | — | — | 8.5 | 12.3 | Excellent | — | Excellent | Good | Example |
| 35 | — | — | 9.3 | 12.2 | Good | — | Excellent | Good | Example |
| 36 | — | — | 9.0 | 12.3 | Excellent | — | Excellent | Good | Example |
| 37 | — | — | 1.4 | 12.0 | Good | — | Poor | Good | Comparative Example |
| 38 | — | — | 9.3 | 12.2 | Good | — | Excellent | Good | Example |
| 38a | 0.032 | 78.0 | 8.1 | 12.2 | Good | Excellent | Excellent | Good | Example |
| 40 | — | — | 8.8 | 12.2 | Good | — | Excellent | Good | Example |
| 41 | — | — | 9.0 | 12.2 | Good | — | Excellent | Good | Example |
| 42 | — | — | 9.3 | 12.2 | Good | — | Excellent | Good | Example |
| 43 | — | — | 1.6 | 12.0 | Good | — | Poor | Good | Comparative Example |
| 44 | — | — | 9.2 | 12.2 | Good | — | Excellent | Good | Example |
| 44a | 0.037 | 75.5 | 7.9 | 12.2 | Good | Excellent | Excellent | Good | Example |
| 46 | — | — | 9.6 | 12.2 | Good | — | Excellent | Good | Example |
| 47 | — | — | 9.5 | 12.2 | Good | — | Excellent | Good | Example |
| 48 | — | — | 10.1 | 12.2 | Good | — | Excellent | Good | Example |

*Ratio of current density after 50 hours to current density after 20 hours

These tables reveal the following points.

(a) The samples of Examples all have low current density after 20 hours in the corrosion resistance evaluation, and show favorable corrosion resistance property even in the event of long exposure to high potential as in 0.5 the separator use environment. In particular, the samples of No. 6, No. 5, No. 18, No. 19a, No. 26, No. 28, No. 30, No. 32, No. 34, and No. 36 having the Sn-containing oxide layer have excellent corrosion resistance property.

(b) The samples of Examples having a Ni—P strike as the strike layer are all less than 100% in the ratio of the current density after 50 hours to the current density after 20 hours in the corrosion resistance evaluation, and maintain favorable corrosion resistance property stably even in the event of long exposure to high potential as in the separator use environment. In particular, the samples of Nos. 13 to 23, No. 15b, No. 15c, No. 15d, No. 18a, No. 18b, and No. 19a having the P content in the suitable range maintain favorable corrosion resistance property more stably, with the ratio of the current density after 50 hours to the current density after 20 hours being less than 80%.

(c) The samples of Examples all have significantly increased tensile strength (peel strength) necessary for film peeling, and have significantly improved adhesion property.

(d) The samples of Examples all have a low sheet thickness increase rate, and have excellent compactness when stacking fuel cells.

(e) The samples of Comparative Examples No. 1, No. 37, and No. 43 having no strike layer have low tensile strength (peel strength) necessary for film peeling, do not exhibit desired adhesion property.

(f) The samples of Comparative Examples No. 11 and No. 24 with the coating weight of the strike layer exceeding the proper range have high current density after 20 hours in the corrosion resistance evaluation, and do not exhibit desired corrosion resistance property.

(g) The sample of Comparative Example No. 12 with the coating weight of the strike layer exceeding the proper range but the Sn alloy layer being thick ensures the corrosion resistance property, but has a high sheet thickness increase rate and does not exhibit desired compactness.

REFERENCE SIGNS LIST 1 membrane-electrode joined body
2, 3 gas diffusion layer
4, 5 separator
6 air passage
7 hydrogen passage
11 sample
12 stainless steel foil substrate
13 strike layer
14 Sn alloy layer
15 cold rolled steel sheet
16 adhesive
17 Sn-containing oxide layer

The invention claimed is:

1. A stainless steel foil for separators of polymer electrolyte fuel cells, comprising:
   a substrate made of stainless steel foil; and
   a Sn alloy layer with which a surface of the substrate is coated, with a strike layer in between,
   wherein a coating weight of the strike layer is 0.001 g/m$^2$ to 0.5 g/m$^2$.

2. The stainless steel foil for separators of polymer electrolyte fuel cells according to claim 1, wherein the Sn alloy layer includes at least one type of element selected from the group consisting of Ni and Fe.

3. The stainless steel foil for separators of polymer electrolyte fuel cells according to claim 2, wherein the strike layer includes at least one type of element selected from the group consisting of Ni, Cu, Ag, and Au.

4. The stainless steel foil for separators of polymer electrolyte fuel cells according to claim 3, wherein the strike layer is made of an alloy layer of Ni and P, and has a P content in a range of 5% to 22% by mass.

5. The stainless steel foil for separators of polymer electrolyte fuel cells according to claim 3, comprising a Sn-containing oxide layer on a surface of the Sn alloy layer.

6. The stainless steel foil for separators of polymer electrolyte fuel cells according to claim 4, comprising a Sn-containing oxide layer on a surface of the Sn alloy layer.

7. The stainless steel foil for separators of polymer electrolyte fuel cells according to claim 2, comprising a Sn-containing oxide layer on a surface of the Sn alloy layer.

8. The stainless steel foil for separators of polymer electrolyte fuel cells according to claim 1, wherein the Sn alloy layer includes at least one type selected from the group consisting of $Ni_3Sn_2$, $Ni_3Sn_4$, FeSn and $FeSn_2$.

9. The stainless steel foil for separators of polymer electrolyte fuel cells according to claim 8, wherein the strike layer includes at least one type of element selected from the group consisting of Ni, Cu, Ag, and Au.

10. The stainless steel foil for separators of polymer electrolyte fuel cells according to claim 9, wherein the strike layer is made of an alloy layer of Ni and P, and has a P content in a range of 5% to 22% by mass.

11. The stainless steel foil for separators of polymer electrolyte fuel cells according to claim 9, comprising a Sn-containing oxide layer on a surface of the Sn alloy layer.

12. The stainless steel foil for separators of polymer electrolyte fuel cells according to claim 10, comprising a Sn-containing oxide layer on a surface of the Sn alloy layer.

13. The stainless steel foil for separators of polymer electrolyte fuel cells according to claim 8, comprising a Sn-containing oxide layer on a surface of the Sn alloy layer.

14. The stainless steel foil for separators of polymer electrolyte fuel cells according to claim 1, wherein the strike layer includes at least one type of element selected from the group consisting of Ni, Cu, Ag, and Au.

15. The stainless steel foil for separators of polymer electrolyte fuel cells according to claim 14, wherein the strike layer is made of an alloy layer of Ni and P, and has a P content in a range of 5% to 22% by mass.

16. The stainless steel foil for separators of polymer electrolyte fuel cells according to claim 15, comprising a Sn-containing oxide layer on a surface of the Sn alloy layer.

17. The stainless steel foil for separators of polymer electrolyte fuel cells according to claim 14, comprising a Sn-containing oxide layer on a surface of the Sn alloy layer.

18. The stainless steel foil for separators of polymer electrolyte fuel cells according to claim 14, wherein the strike layer is made of an alloy layer comprising Ni and P, and has a P content in a range of 7% to 22% by mass.

19. The stainless steel foil for separators of polymer electrolyte fuel cells according to claim 1, comprising a Sn-containing oxide layer on a surface of the Sn alloy layer.

20. The stainless steel foil for separators of polymer electrolyte fuel cells according to claim 19, wherein the Sn-containing oxide layer has a film thickness in a range of 5 nm to 30 nm.

21. A stainless steel foil for separators of polymer electrolyte fuel cells, comprising:
   a substrate made of stainless steel foil;
   a Sn alloy layer with which a surface of the substrate is coated, with a strike layer in between; and
   a Sn-containing oxide layer on a surface of the Sn alloy layer,
   wherein a coating weight of the strike layer is 0.001 g/m$^2$ to 1 g/m$^2$, and
   the Sn-containing oxide layer has a film thickness in a range of 5 nm to 30 nm.

* * * * *